United States Patent
Booij et al.

(10) Patent No.: US 12,510,621 B2
(45) Date of Patent: Dec. 30, 2025

(54) POSITIONING USING COST TERMS

(71) Applicant: Sonitor Technologies AS, Oslo (NO)

(72) Inventors: Wilfred Edwin Booij, Oslo (NO); Cyril Antille, Oslo (NO); Hans Magnus Ewald, Oslo (NO)

(73) Assignee: Sonitor Technologies AS, Oslo (NO)

( * ) Notice: Subject to any disclaimer, the term of this patent is extended or adjusted under 35 U.S.C. 154(b) by 282 days.

(21) Appl. No.: 17/791,125

(22) PCT Filed: Jan. 8, 2021

(86) PCT No.: PCT/GB2021/050046
§ 371 (c)(1),
(2) Date: Jul. 6, 2022

(87) PCT Pub. No.: WO2021/140337
PCT Pub. Date: Jul. 15, 2021

(65) Prior Publication Data
US 2023/0034237 A1   Feb. 2, 2023

(30) Foreign Application Priority Data

Jan. 8, 2020 (GB) .................................. 2000247

(51) Int. Cl.
*H04W 36/36* (2009.01)
*G01S 5/02* (2010.01)
*G01S 5/30* (2006.01)

(52) U.S. Cl.
CPC .............. *G01S 5/0269* (2020.05); *G01S 5/30* (2013.01)

(58) Field of Classification Search
CPC ............ G01S 5/0269; G01S 5/30; G01S 5/02; H04W 88/02; H04W 88/08; H04W 36/36
See application file for complete search history.

(56) References Cited

U.S. PATENT DOCUMENTS 9,641,973 B2 *  5/2017  Venkataramani ..... H04W 4/023
9,820,100 B1 * 11/2017  Jarvis .................... H04W 4/029
(Continued)

FOREIGN PATENT DOCUMENTS

WO    WO 2018/162885 A1    9/2018

OTHER PUBLICATIONS

International Search Report mailed Mar. 30, 2021 for PCT Appl. No. PCT/GB2021/050046, 5 pages.
(Continued)

*Primary Examiner* — Khawar Iqbal
(74) *Attorney, Agent, or Firm* — Sterne, Kessler, Goldstein & Fox P.L.L.C.

(57) ABSTRACT

In a positioning system, a plurality of transmitter units (2, 3, 4, 5) transmit respective locating signals which are received at a mobile receiver unit (7). A processing system (7; 9) identifies the transmitter unit that transmitted each locating signal, and determines, for each transmitter unit, range data representative of a respective distance between the transmitter unit and the mobile receiver unit. The processing system determines a position estimate for the mobile receiver unit (7) by solving an optimisation problem that depends on i) the range data determined for the plurality of transmitter units, ii) data representative of the positions of the plurality of transmitter units in an environment (1), and iii) data representative of a position of a surface (1*a*, 1*b*, 1*c*, 1*d*, 1*e*; 601, 602) in the environment, by optimising for an objective function comprising a cost term that depends on a distance between the surface and the position estimate.

19 Claims, 6 Drawing Sheets

(56) References Cited

U.S. PATENT DOCUMENTS

| | | | | |
|---|---|---|---|---|
| 10,883,833 | B2* | 1/2021 | Akpinar | H04W 4/33 |
| 11,847,747 | B2* | 12/2023 | Mitchell | G06T 7/74 |
| 2008/0026770 | A1* | 1/2008 | Rudravaram | H04W 4/029 |
| | | | | 455/456.1 |
| 2015/0160330 | A1 | 6/2015 | Booij et al. | |
| 2016/0249160 | A1* | 8/2016 | Shinotsuka | G01S 1/75 |
| 2018/0132723 | A1* | 5/2018 | O'Reilly | A61B 6/032 |
| 2018/0356520 | A1* | 12/2018 | Booij | H04B 11/00 |
| 2019/0272348 | A1 | 9/2019 | Booij et al. | |
| 2020/0200863 | A1* | 6/2020 | Booij | G01S 5/18 |
| 2020/0301378 | A1* | 9/2020 | McQueen | G05B 15/02 |
| 2021/0141051 | A1* | 5/2021 | Booij | G01S 5/30 |
| 2021/0209713 | A1* | 7/2021 | Imtiyaz | G06Q 50/40 |
| 2022/0018949 | A1* | 1/2022 | Sharp | G01S 5/28 |
| 2022/0113365 | A1* | 4/2022 | Sosnin | G01S 5/02 |

OTHER PUBLICATIONS

Written Opinion mailed Mar. 30, 2021 for PCT Appl. No. PCT/GB2021/050046, 8 pages.

* cited by examiner

FIG. 6

POSITIONING USING COST TERMS

BACKGROUND OF THE INVENTION

This invention relates to systems and methods for determining the position of a mobile receiver unit in an environment.

It is known to use signals, such as ultrasonic signals, to determine the position of mobile units or tags, in two or three dimensions, by transmitting signals from a plurality of transmitter units, which may be fixed to the walls or ceilings of a building. The signals encode identifiers of the respective transmitters units. These signals are received by the mobile receiver units, which can be attached to objects such as people or equipment. If the positions of the static transmitter units are known, then the times at which a mobile receiver unit receives signals transmitted by the respective transmitter units (i.e. times of arrival) can be used to estimate the position of the mobile receiver unit within the environment, based on geometric principles relating to the propagation of the signals—e.g. by solving equations relating to the intersection of circles or spheres.

For example, WO 2019/038542 discloses a positioning system in which a plurality of static transmitter units transmit respective phase-modulated ultrasonic signatures at regular intervals. Each signature is specific to a respective transmitter unit. The signatures can be received by a mobile receiver unit and their times of arrival used to determine the position of the receiver unit using a geometric multilateration process. The position of the mobile receiver unit may then be displayed on a map or plan of the environment.

While such systems can provide a good level of positioning accuracy, the applicant has devised an approach that has the potential to provide even better positioning accuracy.

SUMMARY OF THE INVENTION

From a first aspect, the invention provides a method of estimating the position of a mobile receiver unit in an environment, the method comprising:

transmitting locating signals from a plurality of transmitter units;

receiving the locating signals at a mobile receiver unit;

processing data representative of the locating signals received by the mobile receiver unit to identify, for each of the locating signals, a respective transmitter unit that transmitted the locating signal, and to determine, for each of the plurality of transmitter units, range data representative of a respective distance between the transmitter unit and the mobile receiver unit; and determining a position estimate for the mobile receiver unit by solving an optimisation problem that depends on i) the range data determined for the plurality of transmitter units, ii) data representative of the positions of the plurality of transmitter units in an environment, and iii) data representative of a position of a surface in the environment, wherein solving the optimisation problem comprises optimising for an objective function comprising a cost term that depends on a distance between the surface and the position estimate.

From a second aspect, the invention provides a positioning system comprising a processing system configured to:

process data, representative of a plurality of locating signals received by a mobile receiver unit from a plurality of transmitter units, to identify, for each of the locating signals, a respective transmitter unit that transmitted the locating signal, and to determine, for each of the plurality of transmitter units, range data representative of a respective distance between the transmitter unit and the mobile receiver unit; and determine a position estimate for the mobile receiver unit by solving an optimisation problem that depends on i) the range data determined for the plurality of transmitter units, ii) data representative of the positions of the plurality of transmitter units in an environment, and iii) data representative of a position of a surface in the environment, wherein the processing system is configured to solve the optimisation problem by optimising for an objective function comprising a cost term that depends on a distance between the surface and the position estimate.

Some embodiments of the positioning system may further comprise the plurality of transmitter units configured to transmit the locating signals. Some embodiments of the positioning system may further comprise the mobile receiver unit configured to receive the locating signals.

From further aspects, the invention provides a computer program, and a transitory or non-transitory computer-readable medium storing a computer program, comprising instructions that, when executed by a processing system, cause the processing system to:

process data, representative of a plurality of locating signals received by a mobile receiver unit from a plurality of transmitter units, to identify, for each of the locating signals, a respective transmitter unit that transmitted the locating signal, and to determine, for each of the plurality of transmitter units, range data representative of a respective distance between the transmitter unit and the mobile receiver unit; and determine a position estimate for the mobile receiver unit by solving an optimisation problem that depends on i) the range data determined for the plurality of transmitter units, ii) data representative of the positions of the plurality of transmitter units in an environment, and iii) data representative of a position of a surface in the environment, wherein the processing system is configured to solve the optimisation problem by optimising for an objective function comprising a cost term that depends on a distance between the surface and the position estimate.

Thus it will be seen that, in accordance with embodiments of the invention, the estimation of the position of the mobile receiver unit takes account of the position of a surface in the environment using a corresponding cost term in an optimisation problem. The surface data may represent a surface of a wall, ceiling or floor of a room, or of the ground outdoors, or a surface of an object or obstacle such as a cupboard, worktop, door, desk, staircase, etc. It may represent part of all of an outer surface of an object. The surface may be planar or curved or multifaceted. The use of a cost term in this way enables the surface to influence the position estimation in a more subtle way than merely acting as a crude virtual boundary that the mobile device is never allowed to cross in the positioning process, as might happen if the position estimate were naïvely constrained to be within a designated region on a map or plan of the environment. Instead, the cost term may represent a likelihood map of the mobile receiver unit being within particular distances of the surface.

In some instances, the likelihood may be non-zero for at least some positions on both sides of the surface. I.e., the cost term may be non-zero for a first position estimate on a first side of the surface and is non-zero for a second position estimate on an opposite side of the surface. This can enable a position estimate to be generated that is on an "unexpected" side of the surface, which may represent a wall of a room, so long as the range data supports this result with sufficiently strongly. This may sometimes be the correct result—e.g. if the modelled surface no longer exists in reality (having been demolished during building work, for instance), or if the mobile receiver unit has passed over the top of, or underneath, an object having a vertical face represented by the surface data. Thus, the cost function may improve the positioning accuracy when a model of the environment is no longer up-to-date or accurate.

In general, the surface may be, or may represent, a physical surface of a real object in the environment. The data may represent the surface accurately or approximately (e.g. depending on a desired level of accuracy in the final position estimate). However, the data may represent a virtual surface, e.g., one that exists only in a model of the environment. The surface data may only approximate reality, or may not always correspond to a true surface at all (e.g. if the reality has changed such that the model is out of date).

Typically, the range data will contain noise and so not be able to provide perfectly accurate position estimates on its own. Incorporating the surface into the optimisation problem has been found to improve positioning performance in some embodiments by enabling the surface to exert a relatively large influence on the position estimate when the range data is relatively unreliable (e.g. is inconsistent across the plurality of transmitter units), and to exert a relatively small influence when the range data is relatively reliable (i.e. consistent). When using a time series of position estimates to display movement of the mobile receiver unit on a digital map, approaches embodying the invention have been found to give rise to a natural and realistic representation of the movement, e.g. compared with a naïve approach of altering the position estimates to force them all to be within a valid region or to lie along a predetermined path (e.g. a crude "snap to path" mapping approach).

The position of the mobile receiver may be determined within an indoors environment, although this is not essential. The environment may comprise a room or a building. It comprise or be within a shopping mall, hospital, warehouse, office complex, domestic residence, etc.

The locating signals may be acoustic signals, such as ultrasonic signals. Ultrasonic signals are acoustic signals having a frequency higher than the normal human hearing range; typically this means signals having a base or carrier frequency above 20 kHz, e.g. between 20 and 100 kHz. Acoustic signals are well suited to use in such a positioning system, especially an indoor positioning system, because they travel much slower than radio waves and light waves. However, the locating signals may comprise optical (e.g. infrared), radio or other electromagnetic signals. Acoustic and optical signals may be advantageous as they are generally confined to one room inherently. Each transmitter unit may transmit a locating signal at intervals. Each locating signal may comprise a signature or identifier that is specific to the respective transmitter unit that transmits the locating signal.

In some embodiments, the processing system may use one or more of the locating signals to identify the environment (e.g. a room) in which the mobile receiver unit is located. It may use this identification to retrieve the data representative of the positions of the plurality of transmitter units and/or the data representative of the position of the surface—e.g. from a memory of the processing system or a remote server. The processing system may receive data representative of the cost term, which may include the data representative of the position of the surface, or which may be separate. The same data representative of the positions of the plurality of transmitter units and of the position of the surface, and optionally of the cost term, may be used to determine a series of position estimates over time while the mobile receiver unit remains in the same environment—e.g. until it is detected as having left a particular room or zone or building. The range data, may of course, differ over time as the mobile receiver unit moves around the environment.

The position estimate may be determined in one, two or three spatial dimensions. Any of the range data, the data representative of the positions of the transmitter units, and the data representative of a position of a surface, may be one-, two- or three-dimensional data, as appropriate. In some embodiments, the position estimate is determined in three dimension (i.e. x, y, z) but the position of the surface may be represented in two dimensions (e.g. horizontally, x, y), with an assumed infinite or maximal extent in the third dimension (e.g. vertically, z). Thus the cost term may vary only in one or two dimensions—e.g. only with height, or only with horizontal position on a plan view map. This can reduce the computation in determining the position estimate.

The optimisation problem may additionally depend on data representative of an orientation and/or a size of the surface. The data representative of a position and/or orientation and/or size of the surface may comprise any one or more of: data encoding a plurality of polygon vertex coordinates in two or three dimensions; data encoding an equation of a 1D line or line segment, a 2D curve, or a 3D curved surface, such as a cylindrical sector; and data encoding a 1D, 2D or 3D vector normal to a surface. In one set of embodiments, the data encodes a plurality of vertices in two dimensions. The vertices may define an open path (e.g. a line) or a closed path (e.g. a rectangle). The path may represent, in plan view, a boundary surface of the environment (e.g. a wall of a room), or a perimeter of an object in the environment (e.g. the horizontal extent of a cupboard).

In some embodiments, the surface is a horizontal surface or plane. The surface may be a floor or ceiling of the environment, or may be a virtual surface parallel to a floor or ceiling. The cost term may vary with height relative to the surface. The cost term for a horizontal surface may be invariant to horizontal position. The cost term may have a minimum value at a predetermined height which may be between a floor and ceiling of the environment, e.g. between 0.5 and 2 metres above the floor, e.g. between 1 and 1.5 metres. This may represent a most probable height for the mobile receiver unit if it is carried by a human user—e.g. in a trouser/pants pocket or in a handbag. The cost term may decrease—optionally strictly—e.g. quadratically, with increasing distance above the predetermined height for position estimates above the predetermined height. It may decrease—optionally strictly—e.g. quadratically, with increasing distance below the predetermined height for position estimates below the predetermined height. The cost term may reach a local or global maximum value, for position estimates within a room, at a floor height and/or at a ceiling height of the room. In this way, the processing system may favour a position estimate that is close to the expected height over a position estimate that is further away from the expected height, if all other factors are equal, thereby improving the expected positioning accuracy.

In some embodiments, the surface is a boundary surface of the environment (e.g. a boundary of a room or building). It may be a vertical surface. An inner side of the surface may face into the environment and an outer side of the surface may face away from the environment. The surface may comprise a fixed surface such as a constructional element of a building, such as a wall or set of walls. It may be part or all of an outer boundary, such an exterior wall, of a building. The surface data may be representative of a boundary surface that partially or fully encloses the environment in at least one plane, e.g. in a horizontal plane. The cost term may increase with distance from the boundary surface for position estimates located on an outer side of the surface. (A distance to a surface may be measured to a closest point on the surface, or to a plane containing the surface, or may be measured along a normal to the surface, or in any other appropriate way.) The cost term may be strictly increasing for such position estimates, e.g. linearly, up to a predetermined distance from the surface, or for all distances on the outer side of the surface. It may increase to infinite cost. The rate of increase may be a configurable parameter that can be set by a user. In this way, position estimates outside the environment can be penalised to discourage, but not prohibit, the processing system from outputting them. The cost term may decrease with distance from the boundary surface, e.g. linearly or polynomially, such as quadractically, for position estimates located on an inner side of the surface—i.e. within the environment. It may be strictly decreasing for such position estimates, at least up to a predetermined distance ($d_p$) from the surface. It may decrease to a value, e.g. zero, at a predetermined distance ($d_p$) from the surface and may be constant (e.g. zero) for all distances beyond this. In this way, position estimates within the environment, but close to a wall, say, may be penalised as less probable, but not impossible, compared with position estimates located well within the "open" environment. The predetermined distance ($d_p$) may be between 0.1 and 1 metre, e.g. around 0.4 to 0.6, or 0.5 metres. It may be a configurable parameter that can be set by a user.

In some embodiments, the surface is a surface of an object located within the environment (e.g. wholly within the environment and/or spaced away from any boundary surface). The surface data may be representative of an outer surface of the object—i.e. having an inner side facing into the object and an outer side facing away from the object. The surface data may be representative of a surface that fully encloses the object in at least one plane, e.g. in a horizontal plane. The inner side of the surface thus defines an inner region, which may correspond to the interior or bulk of the object. In some embodiments, the data may represent the whole outer surface of the object (e.g. including top and bottom faces). However, in other embodiments, it may represent only vertical faces—e.g., representing all the vertical faces of the object, which may be a pillar or a cupboard. The surface data may represent an object in only two dimensions, which may be two horizontal axes (e.g. representing the object in a plan view or a horizontal cross-section). These simplifications may reduce computation load. The represented surface may comprise one or more planar faces that may be vertical, horizontal or at any other angle. The data may represent a vertical surface. In some embodiments, it may represent a surface having infinite vertical extent, positively and negatively, or having maximal positive and negative vertical extent within bounds of the environment. Thus, it may influence the position estimate horizontally (X-Y) but not vertically (Z). Such a theoretical surface may be only an approximation to reality—e.g. it may model an object that does not in fact reach to the ceiling—but such a cost term may nevertheless result in improved positioning accuracy compared with not using the cost term. The cost term for an object surface may be invariant to vertical position.

The object may be an internal wall, barrier or partition, or a fixture such as a build-in cupboard, a kitchen unit, an electric heater, or a shower cubicle, or a fitting such as a table, bed, washing machine, etc. It may be fixed or moveable. Typically, however, it may be an object that is expected to remain in one place for a prolonged period, or else the mapping data relating to the surface is likely to be out of date very quickly. A partition or internal wall may be modelled using a pair of parallel vertical surfaces, spaced apart by the thickness of the wall, each surface influencing the associated cost term in the objective function. The object may be such that the mobile receiver unit is expected never to be within, e.g. inside, the object in normal usage, or only with relatively low probability.

The cost term for a surface of an object may decrease with distance from the surface, e.g. linearly or polynomially, such as a third-order polynomial, for position estimates located on an outer side of the object surface—i.e. away from the object, into the open environment. The distance between the surface and the position estimate may be determined as the shortest straight-line distance from the position estimate to any point on the surface. Note that the surface may envelop the object, at least in a horizontal plane, and so the distance between the surface and the position estimate, on which the cost term depends, may then correspond to the distance between the object and position estimate. The cost term may be strictly decreasing for position estimates on an outer side of the object surface, at least up to a predetermined exterior distance ($d_p$) from the surface. It may decrease to a value, e.g. zero, at a predetermined distance ($d_p$) from the surface and may be constant (e.g. zero) for all distances beyond this. In this way, position estimates within the environment, but close to the object, may be penalised as less probable, but not impossible, compared with position estimates located well within the "open" environment. The predetermined distance ($d_p$) may be between 0.1 and 1 metre, e.g. around 0.4 to 0.6, or 0.5 metres. It may be a configurable parameter that can be set by a user. The same predetermined distance may be used for each of a plurality of surfaces, e.g. surfaces that relating to a common class of object, or to all objects in the same room or environment. In some embodiments, every object surface that is represented in the cost function may use the same predetermined distance ($d_p$). The same value for a predetermined distance ($d_p$) may also be used for boundary surfaces in the environment, although this is not essential.

The cost term for a surface of an object may increase with distance from the object surface, e.g. linearly or polynomially, such as a third-order polynomial, for position estimates located on an inner side of the surface—e.g. inside the object. It may be strictly increasing for such position estimates, up to a predetermined interior distance ($d_n$) from the surface. The same continuous polynomial function (e.g. a third-order polynomial) may be applied for position estimates on the inner and outer sides of the surface. The cost term may increase to a value, e.g. one, at the predetermined interior distance ($d_n$) from the surface. This interior distance $d_n$ may be half the length of a diagonal of the object (optionally within the horizontal plane), e.g. the shortest diagonal, such that the cost term reaches a maximum in the middle of the object. The cost term may be constant (e.g. one) for all distances beyond the distance $d_n$. In this way, position estimates inside the object may be penalised as less probable, but not impossible, compared with position estimates located outside the object.

The cost term may be a continuous function of distance. It may be continuously differentiable.

The cost function may comprise respective cost terms associated with each of a plurality of surfaces—e.g. surfaces associated with different objects—in the environment. Each cost term may vary with distance between its respective surface and the position estimate. Thus the optimisation problem may additionally depend on data representative of positions of a plurality of surfaces in the environment.

Where the objective function comprises a plurality of cost terms relating to a respective plurality of surfaces, the cost terms may be such that each cost term attains a constant value of zero for distances beyond a respective predetermined distance of the respective surface, for positions within the environment (i.e. excluding positions outside the environment, for which cost terms may increase infinitely). These predetermined distances may all be the same distance, or they may differ. The cost terms may be further arranged such, for every position in the environment that is not inside an object, at most one cost term relating to a surface is non-zero. In this way, positional overlap in the influence of different surfaces can be avoided; this can prevent undesirable "valley" effects occurring.

The objective function may additionally comprise one or more cost terms that do not depend on data representative of a position of a surface in the environment. It may comprise one or more cost terms that depend on the range data and on the positions of the transmitter units. For example, it may comprise a cost term that is a function of the difference between i) the distance between the position estimate and a transmitter unit according to the known position of the transmitter unit, and ii) the measured distance between the position estimate and the transmitter unit according to the range data determined from one or more locating signals sent by that transmitter unit. This cost term may be the square of this difference. The objective function may include a plurality of such cost terms, one for each transmitter unit from which a locating signal has been received by the mobile receiver unit (at least within an historic time window).

The objective function may comprise one or more cost terms relating to Doppler-shift measurements, other sensor data such as from an accelerometer, an air-pressure sensor, etc.

Each cost term may be given a weighting factor in the objective function. The objective function may sum the weighted cost terms. A cost term that relates to a surface of an object may be weighted at least partly in dependence on the physical size of the respective object. A cost term that relates to range data determined from a locating signal may be weighted at least partly based on how long ago the locating signal was received, with newer range data being weighted more highly than older range data. A cost term that relates to range data determined from a locating signal may be weighted at least partly based on a signal-to-noise ratio (SNR) estimate associated with the locating signal.

The optimisation problem for determining the position estimate may be a least-squares problem. It may be weighted. It may be a linear regression problem. It may be solved using a regression analysis, such as a weighted least-squares method. It may be solved using the Newton-Raphson method or a quasi-Newton method.

The locating signals may carry encoded data. They may comprise frequency-shift-key (FSK) modulated data. They may comprise continuous-phase FSK (CP-FSK) modulated data. The data may comprise identification data, which may be specific to a respective transmitter unit (e.g. a transmitter-specific identifier or code).

The received signal may be sampled by the mobile receiver unit. It may be down-mixed by the mobile receiver unit in the analogue and/or digital domains. The data representative of the locating signals may be generated by the mobile receiver unit. It may comprise a sequence of complex sample values.

The processing system may identify a transmitter unit that transmitted a locating signal by decoding each received locating signal using appropriate decoding logic. In some embodiments, non-coherent correlation-based decoding may be used, which may provide good robustness to Doppler shift.

Position estimates may be determined repeatedly, e.g. in order to track the mobile receiver unit over time, by repeating the steps disclosed herein at intervals.

The processing system may have access to information representative of a time of transmission of each of the locating signals. The range data may thus be determined using the times of transmission, e.g. by subtracting a time of arrival of each locating signal from a corresponding estimated or known time of transmission. The speed of the signals (e.g. assumed or measured) may then be used to calculate distance values from the times of flight. In some embodiments, the system may be synchronised using signals carried over wired or wireless (e.g. radio or ultrasound) channels.

The position estimate may be determined in one dimension, two dimensions or three dimensions. The position estimate may be stored or output or processed further. It may be input to a Kalman filter.

References to distances and ranges herein may refer to line-of-sight distances, or they may refer to total path lengths e.g. in situations where there is reflection or diffraction.

The processing system may comprise processing circuitry and/or one or more processors and memory storing software for execution by the one or more processors. The processing circuitry and/or software may implement any of the features disclosed herein.

The mobile receiver unit may comprise some or all of the processing system. This may be particularly appropriate when the mobile receiver unit has a display screen and powerful processor, for example if it is a smartphone. In such embodiments, the mobile receiver unit may be arranged to calculate and store its own position estimate. This may avoid the need to communicate data from the mobile receiver unit to be processed elsewhere—e.g., on a remote server.

However, in one set of embodiments, one or more of the transmitter units may comprise some or all of the processing system, while in another set of embodiments, some or all of the processing system may be external to both the mobile receiver unit and the transmitter units—e.g. comprising one or more external servers. This may be advantageous in reducing the processing requirement on the mobile receiver unit, which can reduce its cost and power consumption, even after accounting for the need to transmit data from the mobile receiver unit (e.g., by radio). This may be helpful when the mobile receiver unit is battery powered. The processing system may be split across multiple processors or multiple locations, or both. The mobile receiver unit may be configured to transmit data representative of the received locating signals, or information derived therefrom, to a remote processing unit. The mobile receiver unit and/or a transmitter unit may comprise a wired or wireless transmitter, such as a radio transmitter, for transmitting information relating to a received or transmitted signal.

In some embodiments, the mobile receiver unit may comprise only some parts, or even none, of the processing system—e.g., comprising a sampler for sampling the received signals—while other parts of the processing system—e.g., elements configured to use a time of arrival and decoded transmitter-unit identifier to determine the range data representative of a distance to the mobile receiver unit—may reside in one or more other units, such as on a remote computer or server. The mobile receiver unit may comprise a radio, optical, or other transmitter—e.g., a Bluetooth, WiFi or cellular network transmitter. It may use the transmitter to transmit data relating to the received signals, such as an audio file, or digital samples, or processed data, to a remote processing unit.

In some embodiments, the mobile receiver unit comprises a processor and a display. It may be a mobile telephone (cellphone) or smartphone or tablet or other portable computing device. Alternatively, it may be an asset tag without any complex graphical user interface.

Each transmitter unit may comprise a radio antenna, light-emitting element, acoustic transducer, or other appropriate means of transmitting the locating signals. It may comprise appropriate circuitry for driving or controlling the transmission, such as a DAC, an amplifier, etc. In a preferred set of embodiments, each transmitter unit comprises at least one ultrasound transducer for generating ultrasonic signals. The transmitter units may emit the locating signals at regular intervals, e.g. once every second. The transmitter units may be mobile, but in some embodiments they are static—e.g. fastened to walls or ceilings. They may be beacons.

The mobile receiver unit may comprise a radio antenna, light-receiving element, acoustic microphone, or other appropriate means of receiving the locating signals. It may comprise appropriate circuitry for controlling the reception, such as an amplifier, an ADC, etc. In a preferred set of embodiments, the mobile receiver comprises at least one ultrasound transducer for receiving ultrasonic signals.

The processing system and/or each transmitter unit and/or the mobile receiver unit may comprise any one or more of processors, DSPs, ASICs, FPGAs for carrying out the described steps. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

The processing system may further comprise data storage and/or a display and/or a data connection, and may be configured to store and/or display and/or communicate electronically information relating to the estimated position of the mobile receiver unit. The system may, for example, be arranged to indicate the position of the mobile receiver unit on a map or plan of a building or the environment.

The system may comprise a radio transmitter arranged to transmit timing information to the transmitter units and/or the mobile receiver unit. The transmitter units and mobile receiver unit may be synchronised so that time of arrival information can be used for positioning, instead of time difference of arrival. This may require fewer transmitter units to be in range of the mobile receiver unit for accurate positioning.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
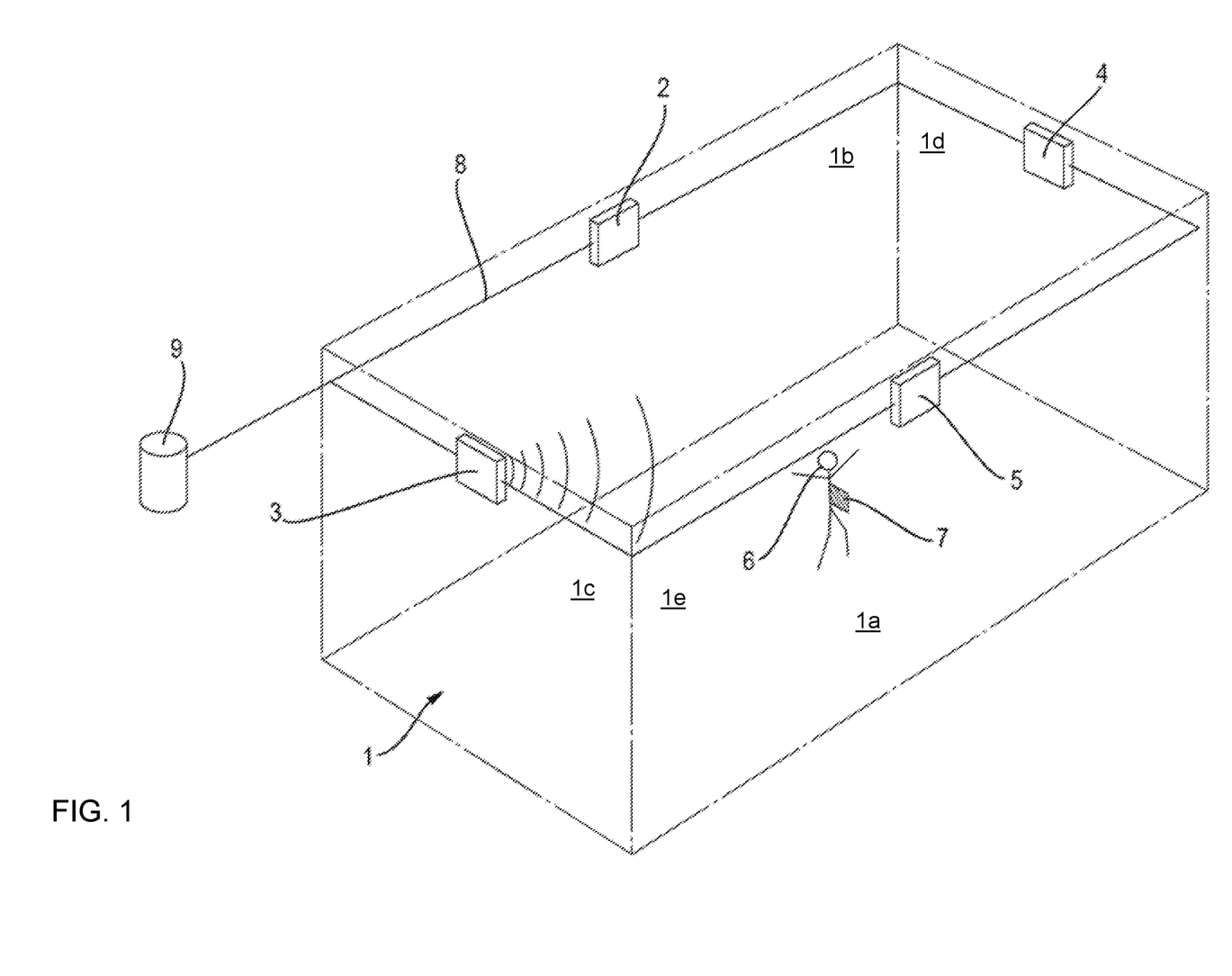
FIG. 1 is a perspective diagram of a positioning system embodying the invention.

FIG. 1 shows part of a positioning system that may be used in, for example, a shopping mall in order to determine the locations of shoppers within the shopping mall. Of course, this is just one example environment, and the positioning system could also be used in warehouses, hospitals, domestic homes, vehicles, etc.

FIG. 1 shows a room 1 defined by a horizontal floor 1a, a rear wall 1b, a left end wall 1c, a right end wall 1d and a front wall 1e. Other details, such as doors, furniture, etc. are omitted for simplicity. Four static transmitter units 2, 3, 4, 5 are fastened to the walls 1b, 1c, 1d, 1e of the room.

A person 6 in the room is carrying a mobile receiver unit 7. A network cable 8 connects each transmitter unit 2, 3, 4, 5 to a server 9, which is typically located in another room or in another building. Alternatively these could be connected wirelessly, e.g. over a WiFi network. These components cooperate to provide a positioning system, capable of estimating the position of the mobile receiver unit 7 in up to three dimensions—e.g. as an (x, y, z) coordinate—within the room 1. In practice, the system may have further similar transmitter units, installed throughout a building or series of rooms, and a plurality of similar mobile receiver units attached to, or incorporated into, people, animals, vehicles, robots, stock, equipment, etc.

Figure 2:
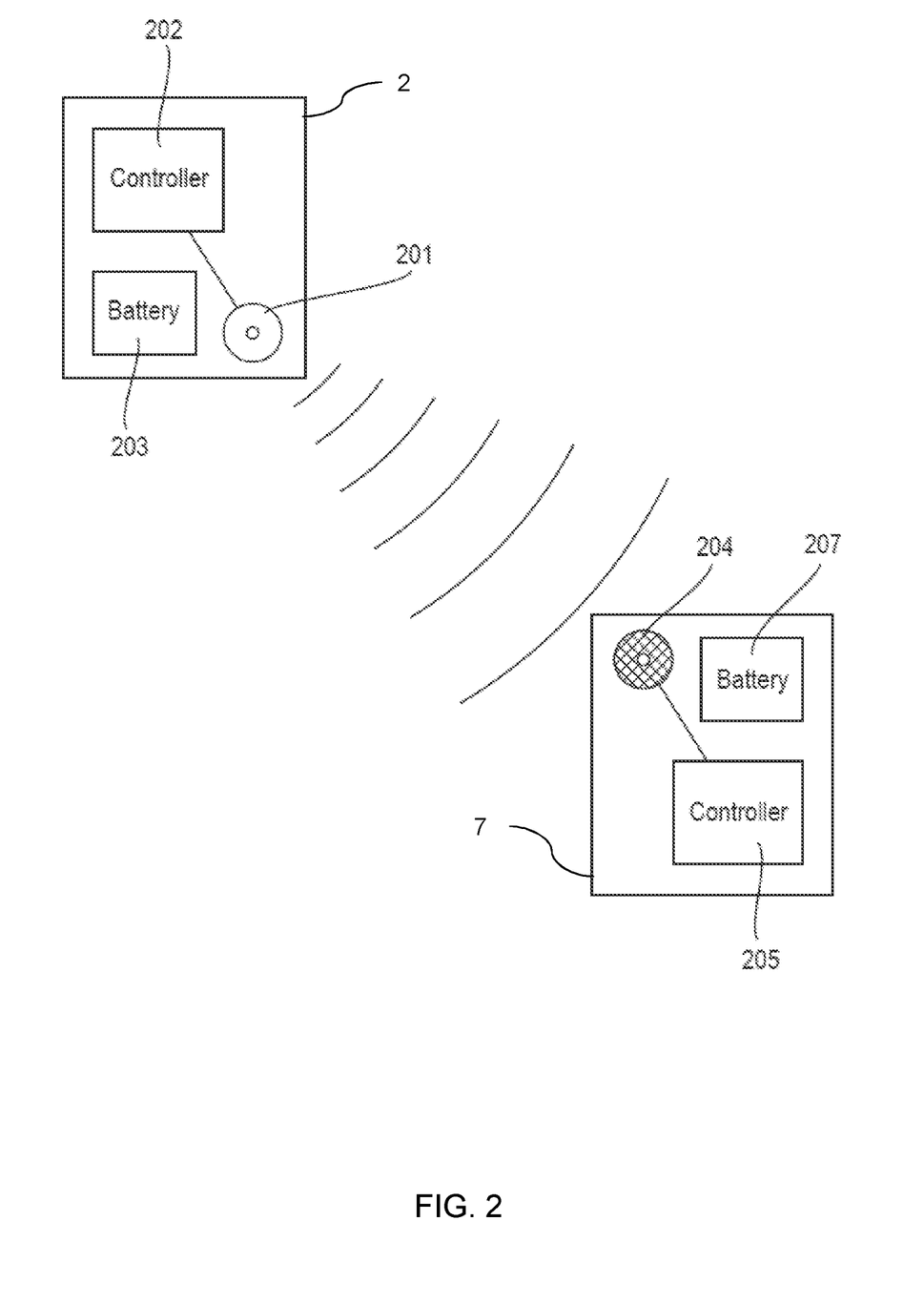
FIG. 2 is a schematic drawing of a static transmitter unit and a mobile receiver unit for use in the positioning system.

FIG. 2 shows a representative one 2 of the transmitter units, and a mobile receiver unit 7. The transmitter unit 2 has an ultrasonic sounder 201, a controller 202 for causing the ultrasound transducer 201 to transmit ultrasonic signals, and battery 203 for supplying power to the transmitter unit. The other transmitter units 3, 4, 5 are similarly configured. The mobile receiver unit 7 has a microphone 204 capable of receiving ultrasonic signals from the transmitter units 2, 3, 4, 5, a microcontroller unit (MCU) 205 for sampling and processing the received signals, and a battery 207 for powering the mobile receiver unit 7. The transmitter units 2, 3, 4, 5 and mobile receiver unit 7 may have further standard electronic components such as radio transceivers, wired-network interfaces, display screens, batteries, buttons, etc. In some embodiments, the mobile receiver unit 7 is a tablet or mobile telephone (cellphone) such as an Apple™ or Android™ smart phone.

Although this description relates to ultrasound signals, it should be appreciate that the use of ultrasound is not essential and other embodiments may instead transmit locating signals that are audible acoustic signals or that are electromagnetic signals such as infrared signals or radio signals.

The microcontroller units 202, 205 can include one or more processors, DSPs, ASICs and/or FPGAs. They can include memory for storing data and/or for storing software instructions to be executed by a processor or DSP. They can include any other appropriate analogue or digital components, including amplifiers, oscillators, filters, ADCs, DACs, RAM, flash memory, etc.

Although the transmitter units 2, 3, 4, 5 are here shown as being static relative to the environment 1, it will be appreciated that, in other embodiments, they may be mobile—e.g., one or more of the transmitter units could be a mobile telephone or device in the possession of a respective user.

In use, each transmitter unit 2, 3, 4, 5 transmits, at regular intervals (e.g. every one second), a locating signal comprising a signature unique to that transmitter unit. The transmissions may be coordinated, e.g. by the server 9, e.g. to minimise negative interference between nearby transmitter units. It will be understand that, in a large deployment, the signatures may be unique only within a locality; if signatures are reused across a system, additional data is preferably used to differentiate between identical signatures. Each signature is encoded on an ultrasonic carrier—e.g., a 20 kHz or 40 kHz carrier. The signature may be contained in a longer transmission that also has one or more additional elements, such as a preamble and/or data content, preferably also encoded on the same ultrasonic carrier band.

It may be desirable to transmit additional information that allows the mobile receiver unit 7 to distinguish between identical signatures from different transmitter units 2, 3, 4, 5. For example, a short-range RF signal, or additional data encoded in an ultrasound signal transmitted by one or more of the transmitter units 2, 3, 4, 5, can allow signatures to be reused in different locations across a site without ambiguity.

The signature may be encoded using any appropriate frequency-shift or phase-shift encoding, but in one set of embodiments, the signature of each transmitter unit 2, 3, 4, 5 comprises a binary identifier encoded using continuous-phase frequency-shift-keying (CP-FSK) modulation.

The mobile receiver unit 7 receives and demodulates the ultrasound signals to identify signatures that have been transmitted by transmitter units 2-5 within audible range of the receiver unit 7, and to determine one or more times of arrival for each signature.

The receiver unit 7 uses an internal clock to timestamp received signatures. The receiver unit 7 may be synchronised with each of the transmitter units 2-5 (and optionally with the server 9) and can therefore also calculate a time of flight (TOF) for each signature it receives. By combining three or more TOF measurements from known transmitter locations, the position of the mobile receiver unit 7 can be determined using geometric principles of trilateration (also referred to as multilateration). This synchronisation may be carried out using a radio channel, such as a Bluetooth Low Energy™ connection, or in any other suitable way.

If the receiver unit 7 is not synchronised with the transmitters 2-5, a time difference of flight (TDOF) method can still be used to determine the position of the receiver unit 7; however, in this case, more transmitter units may have to be in range to get an accurate position estimate.

The position of the receiver unit 7 may be estimated in three dimensions (e.g., as x, y, z Cartesian coordinates relative to a reference frame of the room 1 or building), or in two dimensions (e.g., on a horizontal plane only), or in one dimension (e.g. as a distance along a corridor). The position determination calculations may be performed on the mobile receiver unit 7, or the receiver unit 7 may send information about the received signals, including timing and/or range data, to the server 9, which may perform part or all of the calculations.

The receiver unit 7 will typically receive the same acoustic signal from a transmitter units 2-5 along a direct path (assuming there is a clear line of sight between them) and also along one or more indirect paths, after reflection off one or more surfaces in the environment. The signals may arrive overlapped in time, which can make it challenging to decode the signature accurately. This is especially likely when using low-frequency ultrasound—e.g. around 20 kHz—which has limited bandwidth, so each transmitter-unit identifier takes a significant length of time to transmit. The strength of the instances received along the indirect (reflected) signals will typically be lower than the strength of the direct-path signal, although this is not necessarily always the case (e.g., if a microphone on the receiver unit 7 is angled towards a highly reflective surface such as a glass window pane). The receiver unit 7 may use signal strength to help identify direct-path signals.

The times of flight of received direct-path signals can be input to a multilateration positioning algorithm. The times of flight of any reflections (echoes) may be disregarded in the geometric fit process (although the reflected signals may potentially assist in decoding the received direct-path signature). However, in other embodiments, the times of arrival of reflections may also be used when determining geometric information about the position of the receiver unit 7. Such embodiments may make use of known locations of major reflective surfaces in the environment. Techniques involving real and virtual transmitter locations, which may be employed in such embodiments, are disclosed in WO 2018/162885, filed 5 Mar. 2018, the contents of which are hereby incorporated by reference. The location of the receiver unit 7 may, in some embodiments, be estimated at least in part by estimating an impulse response function from multiple instances of one locating signal, received along a plurality of paths, each instance arriving at a different respective time.

Doppler shift occurs whenever the mobile receiver unit 7 is moving towards or away from one or more of the transmitters units 2, 3, 4, 5. The system may therefore include a Doppler-shift compensation mechanism to enable accurate decoding of the transmitted signatures.

Although processing steps are, for simplicity, described herein as being carried out by the receiver unit 7, it should be understood that, in some embodiments, some or all of these steps may instead be carried out by the server 9, where appropriate.

Intermediate results may be communicated between the receiver unit 7 and the server 9 by any appropriate means, such as via a radio link. The server 9 may be a single physical device, or a distributed (e.g. cloud) server system. It may be in the same building as the room 1 or remote from it—e.g. accessed over the Internet.

Figure 3:
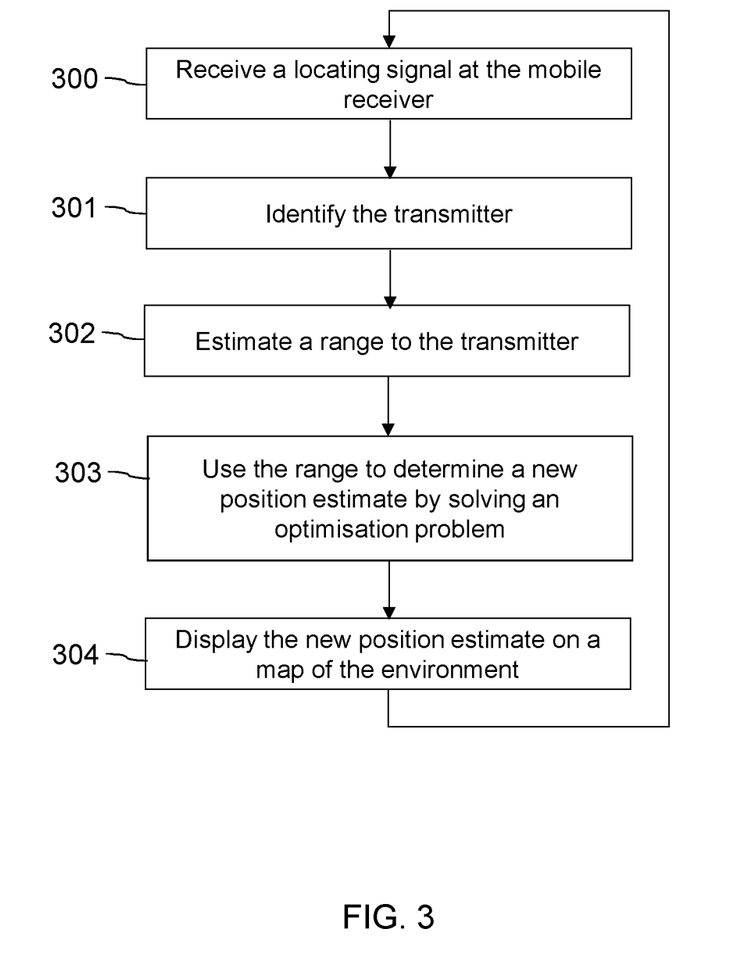
FIG. 3 is a flow chart of operations carried out by the mobile receiver unit and/or the server to estimate the position of the mobile receiver unit.

FIG. 3 is a flow chart providing an overview of key operations carried out by the mobile receiver unit 7 when generating a time series of position estimates. In other embodiments, some or all of these operations may be performed on the server 9.

First, incoming audio, received at the microphone 204, is sampled so as to receive 300 a locating signal transmitted by one of the transmitter units 2-5. This can include a down-mixing process, using analogue and/or digital mixing techniques, to generate a stream of complex IQ baseband samples. The received signal may be critically sampled—i.e. at a sample rate close to the Nyquist frequency for the transmitted signatures.

The received signature is detected by any appropriate technique—e.g. by cross-correlation against template data, or using a deconvolution process—and decoded to identify 301 the source transmitter unit 2-5.

A time of arrival of the received signature is determined. In a synchronized system this allows the time of flight to be determined, which is then used to estimate 302 the range to the source transmitter unit 2-5. In an unsynchronized system, the relative arrival times of signatures from different transmitter units 2-5 could be used instead (i.e. time-difference-of-arrival TDOA positioning).

Assuming the system has already moved beyond an initial start-up phase, a buffer of historic range estimates will have been collected. Each new time of arrival or range estimate can then be input to a position estimation algorithm. This position estimation algorithm collects range data for different transmitter units 2-5, over time, and uses it to determine updated position estimates for the mobile receiver unit 7 over time. Old range data may be discarded from a buffer of range data, or may be given a lower weighting based on its age. Similarly, the algorithm may use decoding error information to weight range data according to a confidence in the accuracy of the assignment of the range to a particular transmitter unit 2-5.

The position estimation algorithm solves a linear optimisation problem (e.g. a weighted least-squares regression), relating to the intersection of spheres (or of hyperboloids if using TDOA positioning).

A latest range estimate for each available transmitter unit 2-5 is then used 303 as input to the position estimation algorithm, which solves an optimisation problem to determine a new position estimate. It does this by finding a position that minimises a cost function (i.e. an objective function).

The cost function includes a respective cost term for each of the walls 1b, 1c, 1d, 1e. Alternatively, the walls 1b, 1c, 1d, 1e could be regarded as a single surface, having a single associated cost term. The cost function also includes a cost term relating to the floor 1a. It may include cost terms relating to other surfaces in the room 1 (not shown), such as partition walls, built-in cabinets, counter-tops, etc. The nature and role of these cost terms is explained in more detail below.

The new position estimate may be combined with data from an inertial measurement unit (IMU) or other sensors, such as velocity data or other position estimates. It may be smoothed using previously determined position estimates. It may be input to a Kalman filter module to generate improved position data. This Kalman filter module may combine acoustic-based position estimates with data from other sensors, such as accelerometers, to improve accuracy even further.

The new position estimate (optionally after such post-processing) may then be displayed 304 on a map, which could be shown on a screen of the receiver unit 7 or of a remote device—e.g. of a client computer connected to the server 9. Of course, this display step is not always required, and the position estimate may be used in other ways instead—e.g. simply being stored in memory for future potential use, or being processed to check if a preconfigured geo-fence has been crossed, or to give audible navigation cues to the user 6, or to display location-dependent advertising on the mobile device 7.

A time series of position estimates may be generated on an on-going basis by looping the process back to the receiving step 300. Although the steps are shown sequentially here, it will be appreciated that at least some of them may be performed in parallel, e.g. with the output of the microphone 204 being sampled continually to detect new locating signals even as the position estimation algorithm is generating an updated position estimate.

Surface Cost Terms

The wall surfaces 1b-1e are included in the cost function for the position estimation as a landscape potential that exerts a "repelling force" on the mobile device 7 when these surfaces are approached. This has been found to result in a much more natural behaviour in the position estimates of the mobile device position 7, e.g. when displayed on a map. Another advantage which this approach is that it can self-adapt to the nature of the positioning in an area; if the positioning signals contain large errors, the landscape cost will have a large effect and vice versa. This means that tunnelling through the walls 1b-1e is possible if the positioning algorithm finds that it has a very low-error solution outside one of the walls. This can of course be correct in real life, with walls 1b-1e and other semi-permanent objects sometimes being moved, e.g. as part of a construction project.

The methods disclosed herein take account of the mathematical properties required, as well as ease-of-use considerations in how the surfaces of objects such as walls can be read from a map and converted to appropriately-shaped potentials.

The cost function may use data representative of the positions of any suitable surfaces in the environment. For example, in a supermarket, various fixtures exist that constrain the movement of human shoppers: outer walls, floor, ceiling, shelves, freezers, pallets containing goods, etc. Such objects constrain a user in different ways. Outer walls offer the most resolute resistance to real users (and are unlikely ever to move or disappear), whereas waist-high freezers may be passable by a mobile device 7, for example if the device 7 is passed from one user to another leaning over a freezer. The landscaping cost function can be designed so as to be able to capture such properties.

A simplistic approach to positioning using a minimization algorithm for generating a position estimate, r, without taking account of any surfaces, could be to use a cost function, J, with the following form:

$$J(r; r_i, R_i) = \frac{\sum w_i ((r - r_i)^2 - R_i^2)}{\sum \text{rel\_}w_i}$$

where:
r is the position estimate (in two- or three-dimensional space),
$r_i$ is the 2D or 3D position of the transmitter unit i, and
$R_i$ is the measured range between the mobile device and the transmitter unit i.

Each transmitter unit i is given a weighting, $w_i$. The weight, $w_i$, may include an absolute component, e.g. which depends on the variance of the measurements for a single transmitter unit i. It may also include a relative component, rel_$w_i$, which may represent a confidence in the transmitter unit i relative to the other transmitter units. The cost function is normalised for the relative weights, rel_$w_i$ but not for the absolute weight components. This is because the absolute component (e.g. variance in the measurements) indicates how reliable each transmitter unit is, so should be taken into account globally in the cost function, whereas the relative weights only indicate which transmitter units are trusted more relative to the other transmitter units, not the reliability of the measurements in an absolute sense.

One challenging aspect of this approach is to make sure that the range $R_i$ is estimated correctly and that appropriate weights $w_i$ are used for each transmitter unit, which may be estimated based on other observable characteristics.

Appropriate weight normalizing can be important when additionally introducing static potentials for surfaces, as the receiver unit 7 does, as it is desirable for a surface to have a well-defined effect that is scaled according to a cost represented by erroneous measurement input $R_i$. A well-proportioned $w_i$ can be expressed as:

$$w_i = \frac{1}{\text{var}(R_i)} \times \left(\frac{P_i}{R_i}\right)^2 = \frac{1}{\text{var}(R_i)} \times \text{rel\_}w_i$$

where $P_i$ is an estimated probability that the detected range is correct (i.e. a confidence measure), which may be determined from factors including the time (i.e. age), spatial origin, signal to noise ratio (SNR), etc. of the range measurement, and var($R_i$) is the variance in the range measures for a particular transmitter station i over a time interval. The relative weight component, rel_$w_i$ here includes the estimated probability $P_i$ for the range measurement and the range itself $R_i$.

The receiver unit 7 may calculate an absolute component of the weight $w_i$ by taking the last two or more range measurements from the transmitter unit i and computing a sample variance for that set. This is done by fitting a line l(t) to the sequence of received measurements, assuming a linear development of the range $R_i$ as the mobile device moves away from, closer to, or on an equidistant path to the transmitter unit. Variance is computed using the deviations of each measurement from that line l(t). Note that this is not the usual way of computing variance from the mean measurement; instead, it represents the variance of the measurement error with respect to the fitted line l(t). Different approaches to calculating weights $w_i$ may be used in other embodiments.

Thus the cost function is normalized for the relative weights but not for the variance of the range measurements $R_i$. Each relative weight term rel_$w_i$ here includes the estimated probability $P_i$ and the range $R_i$ itself. Alternatively, instead of using just the range $R_i$, a received signal strength value (RSS) of a combination of both measures may be used to arrive at an effective weighing that corresponds to spherical attenuation.

Height-Related Cost Terms

One important surface which can be taken into account in the cost function is the floor. An issue in indoor positioning is that height determination can be prone to large errors, as a consequence of the physical positions of transmitter units (often being all at the same height within a given floor of the building), and due to reflections and other factors. In many indoor real-time location system (RTLS) use cases, height (Z axis) is of less interest than a horizontal X, Y position of the mobile device. However, errors in the height determination may lead to large distortions in the X-Y positioning. A simplistic approach to address this is effectively to perform 2D positioning, either fixing the height of the mobile receiver unit to a constant value, or fixing the relative height between the transmitter units (which are assumed to lie in a plane) and the mobile receiver unit.

Some embodiments instead use a soft constraint in the form of a potential, which is added to the cost function, that coerces the z term of an (x, y, z) position estimate to be centred around a most-likely height, $z_0$, of the mobile receiver unit 7, but without statically fixing it at this value. If the device 7 is a smartphone carried by a user 6, this height may be between 1 metre and 1.5 metres above the floor.

A well-formed cost term, $J_z$, that achieves this can be implemented in the MCU 205 using the following quadratic potential for the height coordinate z in relation to a plane at height $z_0$:

$$J_z = c*(z-z_0)_2$$

This cost term is added to the main cost function, J, which is used to determine the best matched position estimate of the mobile device in relation to the static transmitter units 2, 3, 4, 5.

Of importance to the use of this and any other surface-related potentials is that suitable minimization algorithms, which may be implemented by the MCU 205 to solve the optimisation problem, require the cost function to be continuous over the positioning solution space and to have well-behaved first-order and second-order partial derivatives. A quadratic cost constraint fulfils these requirements. The weighting value c has units $m^{-2}$ (since the cost function is dimensionless) may have any suitable value, e.g. in the range 0.1 $m^{-2}$ to 10 $m^{-2}$.

Horizontal Cost Terms

Whereas a height constraint takes a relatively simple form, XY constraints—e.g. for modelling walls or the contents of a room 1 or building—are more complex. The reason is that typical obstacles found in the indoor environments can have rather complex shapes.

To model such objects using well-formed cost functions, embodiments may use an approach that generalises the height constraint approach described above, to give a constraint that increases in a well-defined functional form with distance, and having a continuous functional form that has well-behaved first and second order derivatives.

In addition it may be desirable that the outer walls of a navigable region, such as a room 1 or building, have a cost that increases indefinitely for positions beyond their extent.

Each object (comprising one or more surfaces) can have a specific potential scaling strength a, which expresses how passable the object is.

An object (e.g. a filing cabinet) may be defined as a polygon (e.g. a rectangle) in XY coordinate space, with normals that point inward. A function indicates whether a point XY is inside or outside the object, and provides the distance from the point XY to the closest point of a cylindrical surface having a horizontal cross-section defined by the polygon.

The position estimation algorithm, evaluated by the mobile receiver unit 7 or the server 9, may therefore include one or more "horizontal" landscaping cost terms, as follows:

$$J_{XY}(x, y) = \sum_{i=1}^{N_{obst}} (a_i \cdot g_{obst}(dist_i(x, y); d_n, d_p)) + a_{room} \cdot g_{edge}(-dist_{room}(x, y); m_n, d_p)$$

where:

$N_{obst}$ is the number of objects (excluding outer walls) that are modelled by this particular cost term;

$dist_i$ indicates the horizontal distance from point (x, y) to an object i (note that the distance can be negative, as the cost may continue to change even for positions inside the boundaries of an object);

$g_{obst}(c)$ translates distance, d, from an object (e.g. a support column) into a cost value encoding a penalty for position estimates that are close to or within the object; it is parameterized by the two values $d_n$, and $d_p$, denoting negative and positive limits of the function's active zone as explained below;

$a_i$ is a weight term that can be set to control the relative influence of objects within the overall cost function;

$dist_{room}$ indicates the horizontal distance from point (x, y) inside the room to the outer walls of the room;

$g_{edge}$ (d) translates distance, d, from the outer walls of a room or building into a cost value encoding a penalty for position estimates that are close to or outside the room; it is parameterized by the two values $m_n$ and $d_p$ as explained below; and $a_{room}$ is a weight term that can be set to control the relative influence of the outer walls within the overall cost function.

Broadly speaking, both the $g_{obst}$ and $g_{edge}$ functions assign a low cost to points within the room 1 and far away from their relevant surfaces, and a higher cost to points close to the surfaces.

Although the overall position estimation is performed in 3D, with the cost terms relating to the measured range data being evaluated in three dimensions, in this embodiment the surface-related cost terms for the landscape features are "flattened" by considering only X-Y components. Horizontal surfaces are therefore disregarded. This can reduce the computational burden. However, this is not essential, and objects that do not extend all the way from floor to ceiling may be modelled by using surfaces having vertical boundaries also.

In some embodiments, the $g_{obst}(d)$ function takes the form of a third-order polynomial descending monotonously, as d increases, from a maximum value of 1.0 when $d=-d_n$ to a minimum of 0.0 when $d=d_p$. For $d<-d_n$ (e.g. deep within the object), $g_{obst}$ takes a constant value of 1.0, while for $d>d_p$ (e.g. far away from the object), $g_{obst}$ takes a constant value of 0.0. The parameter $d_n$ may be set to correspond to a centre of an object—e.g. being half the length of a diagonal of the object. Thus the function is defined in a piecewise polynomial manner akin to a spline interpolation. It is continuously differentiable up to the first derivative.

Figure 4:
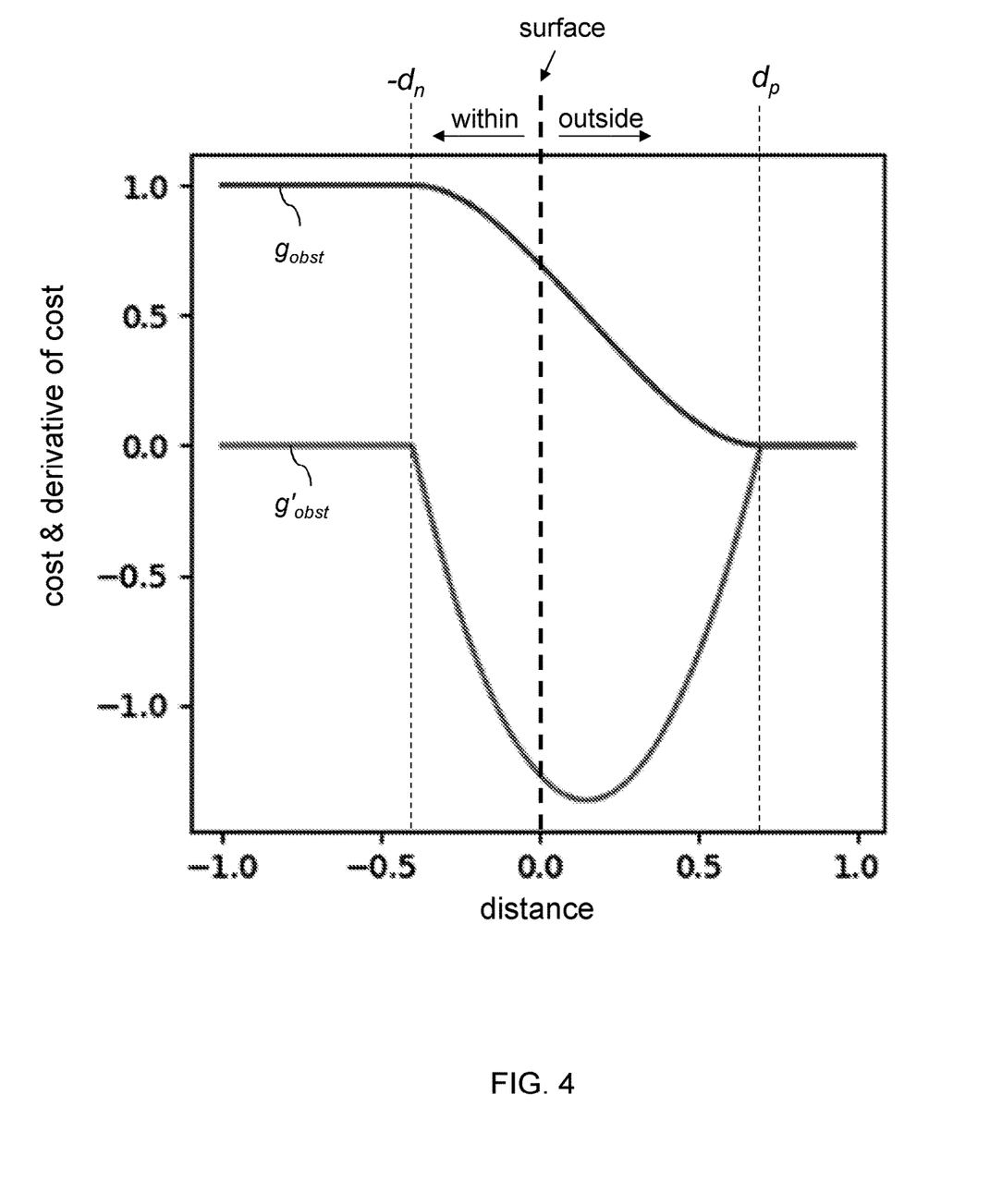
FIG. 4 is a plot showing a first cost term against distance, for a surface of an object, and its derivative.

Mathematically, it can be defined as:

$$g_{obst}(d; d_n, d_p) = \begin{cases} 1: & d < -d_n \\ p_3(d): & -d_n \le d \le d_p \\ 0: & d_p < d \end{cases}$$

where $p_3(x) = ax^3 + bx^2 + cx + d$ such that $p_3(-d_n) = 1, p'_3(-d_n) = 0, p_3(d_p) = 0, p'_3(d_p) = 0.$ FIG. 4 illustrates such a $g_{obst}$ function, alongside its first derivate over distance, $g'_{obst}$, with parameters $d_n = 0.4$ m and $d_p = 0.7$ m. Negative distances correspond to being on the unexpected side of the surface, such as "within" the object.

In some embodiments, the $g_{edge}(d)$ function is a piecewise cost polynomial that differs from $g_{obst}$ in that, while it also returns a cost of 0.0 for distances $d > d_p$ (i.e. far away from the outer walls, inside the room), it increases linearly to infinity, with no upper limit, as d approaches negative infinity (i.e. increasingly far outside the walls of the room). The transition between constant 0.0 cost and linear rising cost is defined by a second-order polynomial, and the whole $g_{edge}$ function is again a piecewise polynomial function continuous up to the first derivative. In this case a parameter $d_p$ again defines how far into the room the potential field reaches, but instead of $d_n$ there is a parameter $m_n$ that defines the steepness of the linear rise to infinity.

Figure 5:
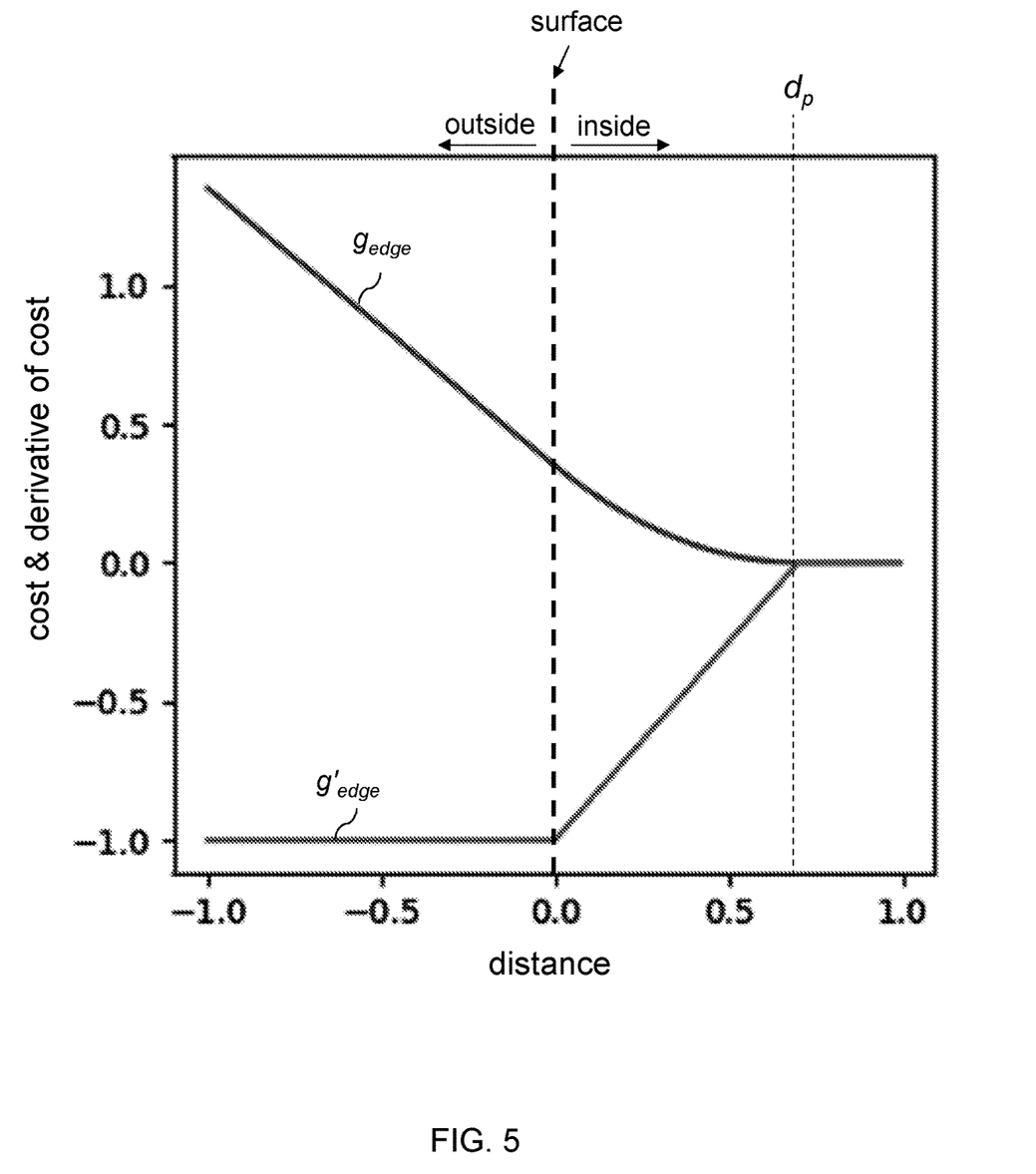
FIG. 5 is a plot showing a second cost term against distance, for a boundary surface, and its derivative.

Mathematically, it can be defined as:

$$g_{edge}(d; m_n, d_p) = \begin{cases} -m_n \cdot d + p_2(0): & d < 0 \\ p_2(d): & 0 \le d \le d_p \\ 0: & d_p < d \end{cases}$$

where $p_2(x) = ax^2 + bx + c$ such that $p'_2(0) = 1, p_2(d_p) = 0, p'_2(d_p) = 0.$ FIG. 5 illustrates such a $g_{edge}$ function, alongside its first derivate over distance, a with parameters $m_n = 1$ and $d_p = 0.7$ m. Negative distances correspond to being on the unexpected side of the surface; in contrast to the $g_{obst}$ function, this means being outside the surface such as outside the room or building, while positive distances correspond to being on the expected side of the surface, which is within the room or building.

Note that ultrasound signals, in particular, are typically strongly attenuated by walls and so naturally confined to the particular room 1 in which the static transmitter units 2-5 are located. Thus, the mobile receiver unit 7 may be able to quickly identify what room it is in, with high confidence, from the received signatures. It can then apply the $g_{edge}$ function to the walls of that room, which will give a realistic modelling of the relatively-low likelihood of the mobile receiver unit 7 being outside the room (e.g. if the signals were spuriously received from an adjacent room, or if a wall has been moved due to building work).

The same value of parameter $d_p$ may be used in $g_{obst}$ and $g_{edge}$, or different values could be used. The same $g_{obst}$ function could be used for every outer surface of an object and/or for every object, i, in the environment (e.g. room), although this is not essential and different parameters or function definitions could be used within the same room. The same applies for $g_{edge}$ with respect to the outer surfaces of a room or environment.

The two parameters $d_n$ and $d_p$ may be the main design inputs for adjusting the landscape potential to a given environment and its objects. The parameter $d_n$ indicates how far into a given object the repelling potential field should continue, while $d_p$ governs how far outside the objects the field will reach. The parameter $d_n$ may be set on a per-object basis—e.g. to equal half the length of that object's shortest cross section. The parameter $d_p$ may be more suited to be a global parameter, otherwise different objects would differ in how far away they repel the positioning solutions which may lead to unnatural results.

It may be desirable to avoid overlap between potential fields of neighbouring objects, as this could create a non-zero "valley" between the objects for the landscaping cost contribution to the overall cost function. Not only does this diminish the repelling effect from the objects, but it also imposes a repelling force at the mouths of the valley, both of which may lead to undesirable outcomes. So, at least in some embodiments, between two neighbouring objects, the sum of their $d_p$ parameters is kept strictly lower than their shortest inter-object distance, so as to preclude potential field overlap and thus avoid such zero valley issues.

Furthermore, because the $g_{obst}$ and $g_{edge}$ functions grow wider proportionally to the sum $d_n+d_p$, with their slope being proportionally reduced in steepness, some embodiments set the scaling strength a, of an object i proportionally to the sum $d_n+d_p$ in order to maintain a consistent potential field strength for objects of varying sizes which may have different $d_n$ values.

Figure 6:
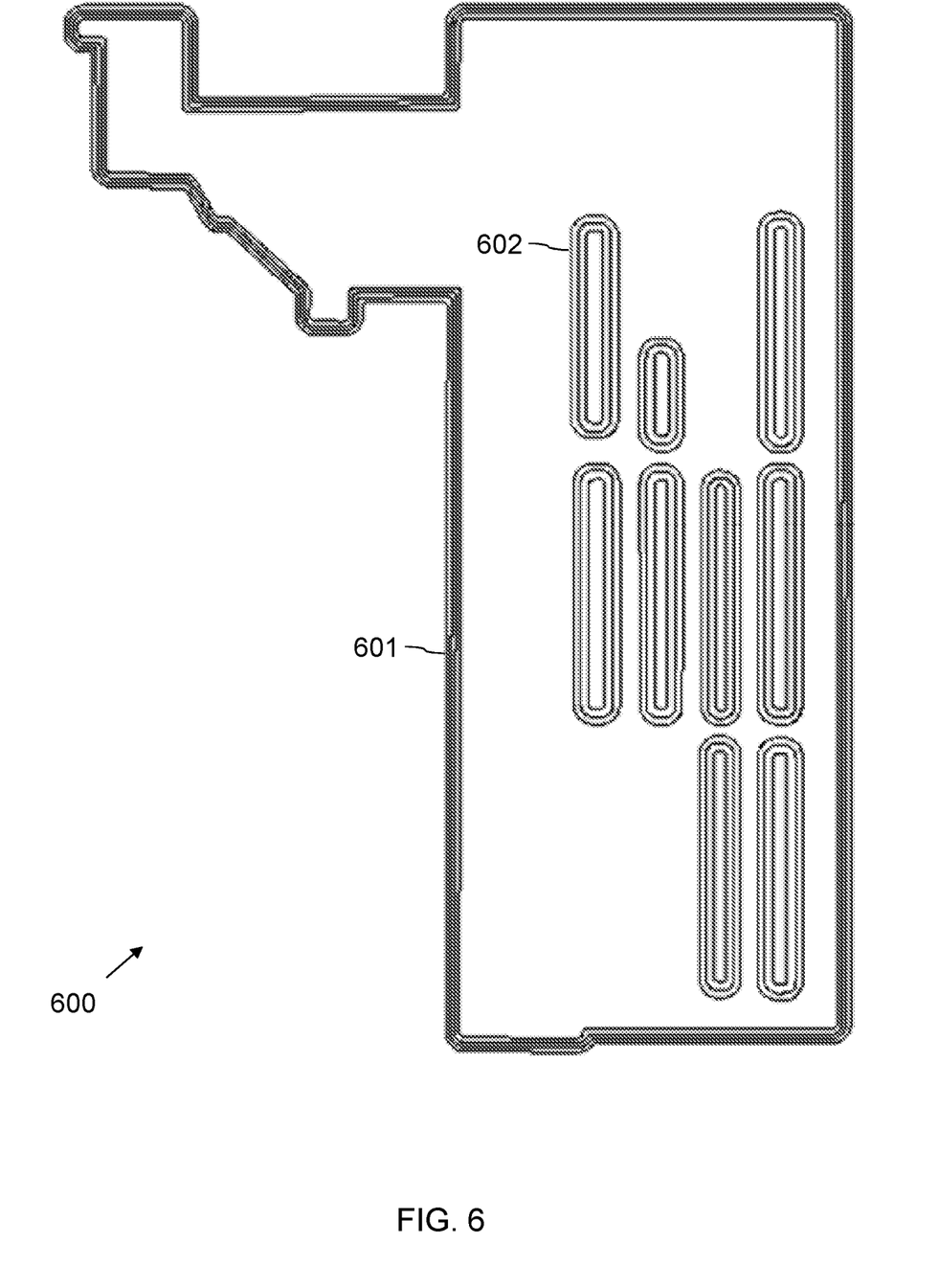
FIG. 6 is an X-Y plot of cost-term potentials for a supermarket.

FIG. 6 provides an example of an X-Y landscape contour plot 600 of a landscape potential applied to a supermarket layout. Potential functions (i.e. cost terms) using $g_{edge}$ are applied to the overall cost function in respect of the outer walls 601, while cost terms using $g_{obst}$ are applied in respect of the shelving racks 602. The denser contour lines of the outer wall 601 signify the steeper potential used there, when compared to costs applied to the shelves 602. The $d_n$ & $d_p$ parameters have been set so that there is no overlap in the potentials between adjacent objects (shelves or walls).

The XY object constraints may be calculated directly by the MCU 205, using the equations outlined above, or, when advantageous from a calculation efficiency perspective, may be interpolated from a pre-calculated table. The latter approach uses the method above to define Jxy for various grid points inside the location and then uses a bi-cubic interpolant to analytically calculate the cost, the gradient of the cost, and the Hessian (if required), at any location X, Y. Alternatively, the gradient and Hessian may be determined numerically.

While a height potential may be implemented in a positioning solution relatively straightforwardly, by selecting appropriate values of the parameters c and $z_0$, it may be more effort to configure an X-Y landscape since it involves determining the shape and nature of objects in the environment. One method involves a manual operator defining the objects, e.g. by classifying them on a map. Alternatively, the server 9 could learn the definitions of objects based on positioning information it determines from a set of mobile receiver units as they are being tracked, or based on automated analysis of moving or static camera images, or CAD models, or maps, or some combination of these approaches.

In some embodiments, an object may be modelled in three dimensions—i.e. having a finite height, in addition to its X-Y surface boundaries. Some embodiments may include a cost term for a curved surface (e.g. a cylindrical post) that uses a geometric curve, rather than a polygonal approximation. This may simplify the distance computation significantly in some cases, especially for regular shapes having circular and elliptical cross-sections.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of estimating a position of a mobile receiver unit in a building, the method comprising:
   transmitting ultrasonic locating signals from a plurality of transmitter units in the building;
   receiving the ultrasonic locating signals at the mobile receiver unit in the building;
   processing, by a processing system, data representative of the ultrasonic locating signals received by the mobile receiver unit to identify, for each of the ultrasonic locating signals, a respective transmitter unit that transmitted the ultrasonic locating signal, and to determine, for each of the plurality of transmitter units, range data representative of a respective distance between the transmitter unit and the mobile receiver unit;
   receiving or accessing, by the processing system, transmitter-unit-position data representative of the positions of the plurality of transmitter units in the building;
   receiving or accessing, by the processing system, building-surface data that specifies a position of a surface of a constructional element of the building; and
   determining, by the processing system, a position estimate for the mobile receiver unit by processing i) the range data, ii) the transmitter-unit-position data, and iii) the building-surface data, to solve an optimisation problem, wherein the optimisation problem comprises an objective function for the position estimate, and wherein the objective function comprises a cost term that decreases with increasing distance from the surface of the constructional element of the building.

2. The method of claim 1, wherein the plurality of transmitter units and the mobile receiver unit are in a room of the building.

3. The method of claim 1, wherein the surface of the constructional element of the building is a vertical boundary surface of the building, or is a surface of an object within the building.

4. A positioning system comprising a processing system configured to:
   process data, representative of a plurality of ultrasonic locating signals received by a mobile receiver unit in a building from a plurality of transmitter units in the building, to identify, for each of the ultrasonic locating signals, a respective transmitter unit that transmitted the ultrasonic locating signal, and to determine, for each of the plurality of transmitter units, range data representative of a respective distance between the transmitter unit and the mobile receiver unit;
   receive or access transmitter-unit-position data representative of the positions of the plurality of transmitter units in the building;
   receive or access building-surface data that specifies a position of a surface of a constructional element of the building; and
   determine a position estimate for the mobile receiver unit by processing i) the range data, ii) the transmitter-unit-position data, and iii) the building-surface data, to solve an optimisation problem, wherein the optimisation problem comprises an objective function for the position estimate, and wherein the objective function comprises a cost term that decreases with increasing distance from the surface of the constructional element of the building.

5. The positioning system of claim 4, further comprising:
the plurality of transmitter units configured to transmit the ultrasonic locating signals; and
the mobile receiver unit configured to receive the ultrasonic locating signals.

6. The positioning system of claim 4, wherein the cost term is non-zero for a first position on a first side of the surface and is non-zero for a second position on an opposite side of the surface.

7. The positioning system of claim 4, wherein the processing system is configured to determine the position estimate in three dimensions, but wherein the cost term varies with distance only in one or two dimensions.

8. The positioning system of claim 4, wherein the optimisation problem additionally depends on data representative of an orientation and/or a size of the surface of the constructional element of the building.

9. The positioning system of claim 4, wherein the surface of the constructional element of the building is a horizontal surface or plane, wherein the cost term varies with height relative to the surface and is invariant to horizontal position, and wherein the cost term has a minimum value at a predetermined height between a floor and ceiling of the building.

10. The positioning system of claim 4, wherein the surface of the constructional element of the building is a vertical boundary surface of the building, having an inner side facing into the building and an outer side facing away from the building, and wherein the cost term increases with distance from the boundary surface for position estimates located on the outer side of the surface, and decreases with distance from the boundary surface for position estimates located on the inner side of the surface.

11. The positioning system of claim 10, wherein the cost term increases linearly with distance from the boundary surface for all position estimates located on the outer side of the surface.

12. The positioning system of claim 10, wherein the cost term is strictly decreasing with distance from the boundary surface for position estimates located on the inner side of the surface, up to a predetermined distance from the surface, and is constant for position estimates beyond the predetermined distance.

13. The positioning system of claim 4, wherein the surface of the constructional element of the building is a surface of an object located within the building, having an inner side facing into the object and an outer side facing away from the object, and wherein the cost term decreases with distance from the object surface for position estimates located on the outer side of the surface, and increases with distance from the object surface for position estimates located on the inner side of the surface.

14. The positioning system of claim 13, wherein the cost term is a strictly decreasing polynomial function of distance from the object surface for position estimates located on the outer side of the surface, up to a predetermined exterior distance from the surface, and is constant for position estimates beyond the predetermined distance.

15. The positioning system of claim 13, wherein the cost term is a strictly increasing polynomial function of distance from the object surface for position estimates located on the inner side of the surface, up to a predetermined interior distance from the surface, and is constant for position estimates beyond the predetermined distance.

16. The positioning system of claim 4, wherein the objective function comprises a plurality of cost terms each associated with a different respective surface in the building, wherein each cost term varies with distance between the position estimate and the respective associated surface.

17. The positioning system of claim 4, wherein the processing system is configured to solve the optimisation problem using a weighted least-squares regression method.

18. The positioning system of claim 4, wherein the mobile receiver unit comprises the processing system and further comprises a display, and is configured to output information derived from the estimated position on the display.

19. A non-transitory computer-readable storage medium storing instructions that, when executed by a processing system, cause the processing system to:
process data, representative of a plurality of ultrasonic locating signals received by a mobile receiver unit in a building from a plurality of transmitter units in the building, to identify, for each of the ultrasonic locating signals, a respective transmitter unit that transmitted the ultrasonic locating signal, and to determine, for each of the plurality of transmitter units, range data representative of a respective distance between the transmitter unit and the mobile receiver unit;
receive or access transmitter-unit-position data representative of the positions of the plurality of transmitter units in the building;
receive or access building-surface data that specifies a position of a surface of a constructional element of the building; and
determine a position estimate for the mobile receiver unit by processing i) the range data, ii) the transmitter-unit-position data, and iii) the building-surface data, to solve an optimisation problem, wherein the optimisation problem comprises an objective function for the position estimate, and wherein the objective function comprises a cost term that decreases with increasing distance from the surface of the constructional element of the building.

* * * * *